United States Patent
Le et al.

(10) Patent No.: US 7,546,456 B2
(45) Date of Patent: Jun. 9, 2009

(54) IPV6 ADDRESS OWNERSHIP SOLUTION BASED ON ZERO-KNOWLEDGE IDENTIFICATION PROTOCOLS OR BASED ON ONE TIME PASSWORD

(76) Inventors: Franck Le, 2715 W. Royal La., #212, Irving, TX (US) 75063; Stefano M Faccin, 3421 Dartmoor Dr., Dallas, TX (US) 75229-2622

( * ) Notice: Subject to any disclaimer, the term of this patent is extended or adjusted under 35 U.S.C. 154(b) by 580 days.

(21) Appl. No.: 10/615,829

(22) Filed: Jul. 10, 2003

(65) Prior Publication Data

US 2004/0008845 A1    Jan. 15, 2004

Related U.S. Application Data

(60) Provisional application No. 60/395,616, filed on Jul. 15, 2002.

(51) Int. Cl.
    *H04L 9/00*    (2006.01)
(52) U.S. Cl. .............. 713/162; 713/150; 713/153; 380/255; 380/277
(58) Field of Classification Search .......... 713/153, 713/168, 171–173, 162; 380/278, 285; 709/229–230
    See application file for complete search history.

(56) References Cited

U.S. PATENT DOCUMENTS

| | | | |
|---|---|---|---|
| 5,475,839 A * | 12/1995 | Watson et al. | 713/2 |
| 5,684,951 A * | 11/1997 | Goldman et al. | 726/6 |
| 5,778,069 A * | 7/1998 | Thomlinson et al. | 380/262 |
| 5,822,434 A * | 10/1998 | Caronni et al. | 713/156 |
| 6,009,528 A * | 12/1999 | Teraoka | 726/22 |
| 6,067,621 A * | 5/2000 | Yu et al. | 713/172 |
| 6,101,499 A | 8/2000 | Ford et al. | |
| 6,151,676 A | 11/2000 | Cuccia et al. | |
| 6,243,832 B1 | 6/2001 | Eckes et al. | |
| 6,507,908 B1 * | 1/2003 | Caronni | 713/153 |
| 6,792,474 B1 * | 9/2004 | Hopprich et al. | 709/245 |
| 6,971,005 B1 * | 11/2005 | Henry et al. | 713/155 |

(Continued)

FOREIGN PATENT DOCUMENTS

EP    0 588 519    3/1994

(Continued)

OTHER PUBLICATIONS

Montenegro, Statistically Unique and Cryptographically Verigiable (SUCV) Identifiers and Addresses, Feb. 2002, NDSS'02.*

(Continued)

*Primary Examiner*—Kimyen Vu
*Assistant Examiner*—Yogesh Paliwal

(57) ABSTRACT

A method and system for proving ownership of an IPv6 address of a node in an IP based communication system. The node generates or has a private key corresponding to a public key, computes an address using the public key. The node verifies owning the address by generating answer to at least one question presented by another node, the answer being generated using the private key corresponding to the public key. According to another embodiment, for proving ownership of the IP address, the node generates the IP address based on passwords used only once, and the another node receiving the IP address verifies that the node owns the IP address by checking the password.

15 Claims, 4 Drawing Sheets

Target: the MN proves its address ownership in t executions of a 3-pass protocol

U.S. PATENT DOCUMENTS

| | | | |
|---|---|---|---|
| 2002/0002678 | A1 | 1/2002 | Chow et al. |
| 2002/0016926 | A1* | 2/2002 | Nguyen et al. ............... 713/201 |
| 2002/0093915 | A1* | 7/2002 | Larson ....................... 370/235 |
| 2002/0133607 | A1* | 9/2002 | Nikander .................... 709/229 |
| 2003/0056094 | A1* | 3/2003 | Huitema et al. ............. 713/157 |

FOREIGN PATENT DOCUMENTS

| | | |
|---|---|---|
| EP | 1 039 724 | 9/2000 |

OTHER PUBLICATIONS

Mortensen, Password Protection: Is This the Best We Can Do?, Aug. 2001, SANS Institute.*

Schneier, Applied Cryptography, 1996, Wiley, 2nd Edition.*

Mankin et al.: "Threat Models Introduced by Mobile IPv6 and Requirements for Security in Mobile IPv6," URL: http://www.ietf.org/proceedings/02mar/I-D/draft-ietf-mobileip-mipv6-scrty-reqts-02.txt Nov. 5, 2001, retrieved on Oct. 17, 2003.

Menezes A, Van Oorschot, Vanstone S: "Customized and Zero Knowledge Identification Protocols" Handbook of Applied Cryptography, http://www.cacr.math.uwaterloo.ca/hac/about/chap10.pdf Dec. 31, 1996.

International Search Report for PCT/IB 03/02189, mailed Dec. 23, 2003.

Feige-Fiat-Shamir Identification Scheme from http://en.wikipedia.org/wiki/Feige-Fiat-Shamir_Identification_Scheme, printed Aug. 9, 2007.

* cited by examiner

Target: the MN proves its address ownership in t executions of a 3-pass protocol

IPV6 ADDRESS OWNERSHIP SOLUTION BASED ON ZERO-KNOWLEDGE IDENTIFICATION PROTOCOLS OR BASED ON ONE TIME PASSWORD

CROSS-REFERENCED TO RELATED APPLICATION

The present application claims the benefit of priority of provisional application Ser. No. 60/395,616, filed Jul. 15, 2002, the contents of which are incorporated herein by reference.

BACKGROUND OF THE INVENTION

The present invention relates to a system and method for solving IPv6 address ownership problems.

This invention is related to IPv6 and more particularly to the address ownership problem. IPv6 has a well-known problem called address ownership. In current IPv6, hosts cannot prove that they own the claimed IP address and are authorized to use it. This problem is responsible for different potential attacks and as a consequence limits the benefits of protocol such as MIPv6. This problem is not unique and restricted to mobile networks but affects the whole IPv6 in general. The IPv6 address ownership problem is therefore an important security problem that should be properly addressed.

According to the initial design goals, the basic routing and packet forwarding mechanisms in IPv6 were supposed to be similar to those of IPv4. However there are considerable differences in the way the hosts and routers learn and use the information. The IPv6 address configuration procedures e.g. allow a more dynamic distribution and discovery of the routing information and facilitate mobility and network management. Mobility support has been considered since the beginning in the design of IPv6 and all hosts must support the specified extensions. Although these mechanisms bring known benefits, they also open the door for a new set of security threats.

Mobile IPv6 introduces new extensions to the IPv6 protocol and new entities, such as the Home Agent (HA) in order to support node mobility. Mobility is achieved thanks to the Binding update and Binding acknowledgement messages exchanged between the Mobiles Nodes (MN) and the HA, and between the MN and their correspondent nodes (CN). These Binding Update messages update the receiving ends with the current location of the MN (i.e. the Care of Address (CoA)) and must therefore be authenticated to prevent several types of attacks identified and described in "Allison Mankin, Basavaraj Patil, Dan Harkins, Erik Nordmark, Pekka Nikander, Phil Roberts, Thomas Narten. Threat Models introduced by Mobile IPv6 and Requirements for Security in Mobile IPv6. Internet draft, work-in-progress, Internet Engineering Task Force, 05 Nov. 2001".

Defining a dynamic key establishment protocol between the MN and the CN, this MN-CN security key can be used to authenticate the binding update messages. By simply applying message authentication to the binding update message, the mechanisms remain vulnerable to a set of different attacks. In particular, the security threats derived from the address ownership problem: in current IPv6, hosts cannot prove that they own the claimed IP address and are authorized to use it. As a consequence the IPv6 world is vulnerable to different types of impersonation, denial of service and man in the middle attacks.

The problem is illustrated in this document via the future attacks but this is only one of the possible attacks derived from the IPv6 address ownership problem.

A typical attack derived from the address ownership problem is represented in FIGS. 3 to 5. An attacker may come to a subnet and knowing the interface ID of e.g. another user, he can derive the victim's to be CoA (Care-of Address) and steal all the future sessions of this user.

When assuming a victim, an attacker and a server, the attacker can know or learn the L2 address of the chosen victim by different means. When coming to a subnet, it can therefore derive the IP address that the victim will use when coming to this subnet; more particularly by concatenating the advertised network prefix, and the chosen victim's L2 address as specified e.g. in the stateless address auto configuration "S. Thomson, T. Narten: IPv6 Stateless Address Autoconfiguration, Internet Request for Comments RFC 2462, Internet Engineering Task Force, December 1998". Let us call IP1 this IP address.

The attacker can open a session with the server using IP1: he will claim IP1 as its Home address (step 1). The attacker will then move to a different subnet and send a Binding update to create a binding cache in the server (step 2). When the victim will then send a request to the server (step 3), since this one has a binding cache for this IP address, it will send the response to the attacker.

The attacker can maintain the binding cache by sending binding update to the server, and even if these messages are authenticated thanks to a security key, this security association cannot prevent this type of attack. Unless a host can prove that it is authorized to use the claimed IP address, the mechanisms are thus vulnerable to different impersonation, denial of service and man in the middle attacks.

Two main schemes have been suggested so far to solve the IPv6 address ownership issue. A Return Routability (RR) test specified by the Mobile IP working group and mandated in the MIPv6 protocol requires seven messages to be exchanged between the mobile node and the correspondent node. Binding Security Associations are not used in MIPv6, but every time MN (Mobile Node) wants to send a BU, it needs to perform the RR test which requires seven messages to be sent over the air interface. In wireless links, this is unacceptable. In addition, the lifetime of the RR test is only 5 minutes; and the RR tests then needs to be re-executed. This large number of required messages is a major constraint for wireless networks where bandwidth is limited and expensive. In addition this RR test must be frequently (periodically) re-executed to prevent potential future attacks. And despite all these constraints, this protocol does not solve the problem; it just limits the potential damages that could be performed against the MN and the CN, and is still vulnerable to different types of attacks: e.g. considering a n ongoing IPv6 communication between two nodes A and B, which do not have to be mobile, (B just implementing the mandatory CN functionalities of MIPv6); a third node C located on the path between A and B could foil the RR test and send a BU to node B for node A including an own "CoA".

A second solution is called Cryptographically Generated Address (CGA). This scheme relies on Public keys/Private keys operations; digital signatures require heavy computations both to compute the signature and to verify it; and are therefore an issue for mobile nodes which most probably will not have the computational capability to support digital signatures. Digital signatures and signatures verifications require a lot of processing. Many mobile nodes are low end processing and can not perform all the required computations.

Both solutions thus have major constraints and most probably IPv6 hosts will therefore not deploy them preventing the utilization of Route optimization which is a key driver for Mobile IP; these security issues may therefore hammer Mobile IP preventing the adoption and a large scale deployment of this protocol.

In the context of Mobile IPv6, in order to solve this problem, the MN and the CN must frequently perform the RR test but this protocol requires 7 messages to be exchanged; and this test must be performed not only when the MN changes its CoA but also periodically. The number of messages thus required, is a problem for wireless networks where bandwidth is limited and expensive.

The Fiat-Shamir identification protocol is described in: Handbook of Applied Cryptography; Menezes, van Oorschot and Vanstone p405-411. The Guillou-Quisquater identification protocol is discussed in: Handbook of Applied Cryptography; Menezes, van Oorschot and Vanstone p412-414. The "Handbook of Applied Cryptography"; Menezes, van Oorschot and Vanstone p412-414, describes the Schnorr identification protocol. The SUCV proposal is described in http://search.ietf.org/internet-drafts/draft-montenegro-sucv-02.txt.

SUMMARY OF THE INVENTION

According to one aspect, the invention provides a method as defined in the independent method claims or any one of the dependent method claims.

According to a further aspect, the invention provides a system as defined in the independent system claims or any one of the dependent system claims.

The invention provides a solution for address ownership problems e.g. in IPv6.

The invention with all its embodiments and/or variations and/or combinations can be applied to e.g. IPv6 address ownership solution based on e.g. zero-knowledge identification protocols or based on one time password.

The invention describes efficient methods and systems for the user or MN to prove that she/he owns the claimed IP address. In other words, the methods described provide security against IP spoofing types of attacks.

In order to prove that the user or MN or terminal or stationary node owns the IP address, this invention describes a new way to generate the IP address.

It describes an efficient method and system for a user or MN to prove that it owns and is authorized to use the claimed IP address.

It therefore solves different types of attacks such as the future attacks shown in FIGS. 3 to 5.

Such a procedure for a MN to prove that it owns a claimed IP address has several applicabilities: it can e.g. also prevent IP spoofing, TCP flooding, etc. To illustrate the solution, its applicability to the case of Mobile IP (where the MN needs to be able to send BU messages securely to the CNs) is more particularly described below.

The invention thus describes a technical solution which satisfies the following objectives:

a MN is able to create IP addresses dynamically and prove to other nodes that it owns the address (i.e. it does not correspond to any other MN) and it is authorized to use the address;

the solution does not rely on the presence of any infrastructure (e.g. AAA, PKI);

the solution is as lightweight as possible for the MN and the correspondent nodes in terms of computational effort, amount of signaling and amount of memory required.

The MN need not be assigned a permanent IPv6 Home Address, but is configured with the prefix of the Home Network to which the Home Address should belong to. Both Home Address (HoA) and Care of Address (CoA) are preferably dynamically generated.

The invention provides according to one aspect a method and system for proving ownership of an address of a first node in an e.g. IP based communication system. The first node has a private key and public key pair, and generates an address using the public key, which is provided to a second node. The second node sends an address verification request to the first node, and the first node proves to the second node that it owns said dynamic address by providing an address verification answer generated using said private key corresponding to said public key. The step of generating the address preferably comprises the steps of computing a function using the public key to generate an address generation value, and generating the address, preferably a dynamic address, using said address generation value.

The address may be an IPv6 (IP version 6) address. The first node preferably generates a pair of private/public keys according to an identification protocol, preferably a zero knowledge identification protocol. The address generation value may be computed e.g. by applying a hash function to the public key. The address generation value may be used as a suffix for generating said dynamic address.

The address verification request sent by said second node preferably includes a cookie and/or a challenge, e.g. a random number. The cookie may be computed by said second node using a security algorithm and a security key of said second node. The first node preferably sends an address verification response including a response, computed by applying the private key to the challenge, and/or the public key and/or the cookie.

The second node may verify that said first node owns said dynamic address by computing a hash of the public key and comparing the resulting value with the address generating value which may be inserted in a suffix of the dynamic address, and/or by applying the public key to the response and comparing the result with the challenge.

According to a further aspect of the invention, a method and system are provided for proving ownership of an IP address of a node in an IP based communication system, wherein the node generates the IP address based on passwords used only once, and another node receiving the IP address verifies that the node owns the IP address by checking the password.

The node may generate the IP address using an advertised network prefix and the password as the suffix.

The node may insert a number into the generated IP address, the number being incremented or decremented each time the IP address is transmitted to the another node, the another node additionally checking the number for verifying ownership of the IP address.

DETAILED DESCRIPTION OF THE INVENTION

Figure 1:
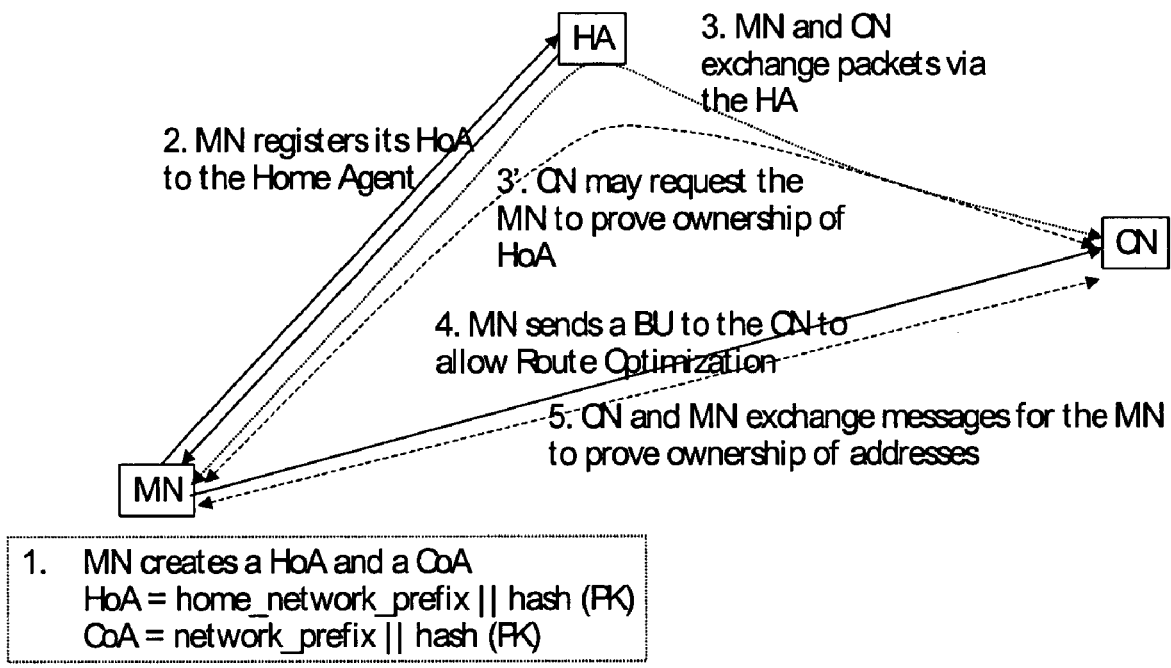
FIG. 1 illustrates a first embodiment of the invention.

The invention describes an efficient way to authenticate a node (e.g. an Ipv6 node) or a message (e.g. a binding update message) in the context of IP, preferably but not necessarily Mobile IP, or other scenario such as TCP.

According to a first embodiment of the invention, the following steps and/or means or functions are provided.

This embodiment more particularly describes the applicability of the method and system according to the invention to the context of Mobile IP thus defining a new mechanism to send e.g. Binding Update messages securely from a node (e.g. Ipv6 Node) such as a MN to the CN(s).

In particular, the embodiments described aim at solving the need for a Mobile IPv6 MN to be able to send securely Binding Update messages to Correspondent Nodes with which no previous security associations exist, and in particular the CN needs to be able to verify that the MN owns the Home Address and the Care-of Address in the Binding Update message.

The description focuses on the problem specifically for Mobile IPv6. In an initial Set Up phase, the Mobile Node (MN) generates one pair of private/public keys according to the adopted zero-knowledge identification protocols. The identification protocol can e.g. be Feige Shamir, Giullou Quisquater, Schnorr, or any derived or new identification protocol.

The user, i.e. MN, then computes a hash of the public key and the result is used at the suffix for the IPv6 addresses:

For the Home IP address, the MN concatenates the Home Network prefix (or the local network prefix, according to the usage scenarios described below) and the computed suffix:

HoA=network_prefix∥hash (Public_Key).

As for the IP Care of Address (CoA) (when this is computed, according to the scenarios below), instead of using the Layer 2 address as specified in the IPv6 stateless address autoconfiguration [RFC 2462], the user uses the hash of the public key to derive the IPv6 address:

CoA=network_prefix∥hash (Public_Key)

The MN then registers its generated HoA with a Home Agent, in order for the Home Agent to be able to defend the address and forward incoming packets to the MN. Security for this step is out of the scope of this document.

With both Care-of Address and Home Address generated dynamically by the MN, "push services" (i.e. flows of IP packets generated by a CN without previous contact by the MN) are not supported until the MN first contacts the CN. It has to be noted that this solution is in no way worst than CGA from the point of view of push services.

Protocol messages overview: The present embodiment is based on a zero-knowledge identification mechanism. With this type of mechanism, in order to prove ownership of an address the MN exchanges the following messages with the CN:

1.) MN--->CN: Witness

The MN generates a Witness and sends it to the CN

2.) MN<--- CN: Challenge

The CN sends a challenge to the MN. The main idea behind these mechanisms relies on "a set of questions" from the CN to the MN using zero-knowledge identification protocols.

3.) MN--->CN: Response, Public Key, modulus

The MN replies by providing the information needed to prove ownership of the addresses. The MN being able to answer correctly to all the questions (3) proves that it has knowledge of the private key corresponding to the public key whose hash is in the IP addresses and therefore owns the addresses. In step 3, the CN comparing the claimed public key with the hash value from the IP addresses and making some other verification will be able to verify that the MN owns the claimed IP address(es).

This solution therefore describes a new way to derive the IP addresses based on the zero-knowledge identifications protocols to solve the address ownership problem. This solution does not select a specific identification protocol thus allowing more flexibility: each protocol has relative advantages/disadvantages in terms of communications, memory, and security guarantees.

The way these parameters are computed depends on the adopted identification protocol. Embodiments will be described in the following for illustration of the invention.

Several different usage scenarios are described in the following. First, a case will be explained where a Dynamic HoA (Home address) is generated with Home Network. In this scenario, the MN creates a dynamic Home Address by generating the address suffix as described below and by using the prefix of the Home Network to which the Home Address shall belong to.

In an initial Set Up phase, as illustrated by step 1 of the embodiment shown in FIG. 1, the following steps or functions are performed.

For the Home Address, the MN concatenates the Home network prefix and the resulting suffix:

HoA=home_network_prefix∥hash (Public_Key)

For the Care of Address (CoA), the MN computes the address similarly:

CoA=network_prefix∥hash (Public_Key)

The MN then registers its generated HoA with a Home Agent in step 2 of FIG. 1, in order for the Home Agent to be able to defend the address and forward incoming packets to the MN.

Protocol details for an embodiment solution based on the Feige-Fiat-Shamir identification protocol will first be described. When the MN needs to setup a communication with a CN, according to the latest Mobile IPv6 specifications the MN needs to send packets to the CN by tunnelling them through the HA (reverse tunnelling), i.e. all the packets (both uplinks and downlinks) must go through the HA since the CN would not accept a packet containing the Home Address option from a MN for which it does not have a binding cache entry. In a step 3 of FIG. 1, the CN may request the MN to prove ownership of HoA. If the MN prefers to use Route Optimization, it needs to send a secure binding update to the CN, as shown in FIG. 1, step 4.

In a step 5, the MN proves its address ownership in e.g. t executions of a 3-pass protocol. Several messages are exchanged between CN and MN. Parameters Set up: The MN computes the common modulus n=pq after selecting two secret primes p and q each congruent to 3 mod 4, and such that n is computationally infeasible to factor. Integers k and t are defined as security parameters.

Computation of the secrets: MN does the following:

selects k random integers $s_1, s_2, \ldots s_k$ in the range $1<s_i<n-1$ and k random bits $b_1, \ldots, b_k$ computes $vi=(-1)^{bi}.(s_i^2)^{-1}$ mod n for $1<i<k$ computes a hash of its public key $(v_1, v_2, \ldots v_k; n)$ and derives the corresponding IP addresses. MN securely stores its private key $(s_1, \ldots, s_k)$.

This completes the set-up phase.

Protocol Messages:

1. MN computes the HoA and CoA from the resulting public key:

HoA=home_network_prefix∥hash (Public_Key)

CoA=network_prefix∥hash (Public_Key)

2. MN registers its Home address with a Home agent.
3. MN establishes a communication with a CN (based on the M's HoA) and packets are going through the Home Agent. The CN may request that the MN proves address ownership of the HoA. In such cases, the MN should do the necessary operations as described below.
4. In order to use route optimization, the MN sends a Binding Update to the CN:

MN->CN: $x(=+/-r^2 \mod n)$; HoA; CoA

5. The MN actually chooses a random integer r, $1<r<n-1$, and a random bit b; computes $x=(-1)^b.r^2 \mod n$ and sends x (the witness) to CN with its HoA and its CoA.

6. MN<-CN: $(e_1, \ldots, e_k)$ with each $e_i$ equals 0 or 1; cookie.

In response, the CN sends to MN (the challenge) a random k-bit vector $(e_1, \ldots, e_k)$ and a cookie: the generation of the cookie is implementation dependant. It could e.g. be computed taking as inputs the HoA, the CoA, the Challenge and some internal secret.

MN<-CN: $y(=r*\Pi(e_{j=1})s_j \mod n)$; $(v_1, v_2, \ldots v_k)$; n; HoA; CoA; cookie MN computes and sends to CN the response $y=r*\Pi$(j from 1 to k)$s_j^{(ej)} \mod n$ (the product of r and those $s_j$ specified by the challenge)

The CN verifies that hash $(v_1, v_2, \ldots v_k; n)$=IP addresses suffix, and the cookie is valid before computing $z=y^2*\Pi$(j from 1 to k)$v_j^{(ej)} \mod n$ and verifying that $z=+/-x$ and $z\neq 0$.

If the verifications pass, the CN creates a binding cache for the MN and sends the MN a Binding acknowledgement to inform it of the success. The packets exchanged between the MN and the CN do not need to go through the HA anymore.

Compared to CGA, this solution also uses Public keys but does not rely on digital signatures to prove the ownership of the address. This solution is therefore well suited for endpoints with low-power processors. Most mobile nodes fall in that category.

Digital signatures require a lot of processing. As a rough performance comparison, according to [1], the Fiat Sharmir protocol requires between one and two orders of magnitude fewer full modular multiplications (steps) by the prover than an RSA private key operation. When kt=20 and n=512 bits, Fiat Shamir uses from 11 to about 30 steps whereas a full exponentiation in unoptimized RSA takes 768 steps. The digital signature verification at the receiving end also requires a lot of processing.

Compared to the current RR test defined in the MIPv6 specifications, in the proposed scheme, MN will only have to send authenticated BU when changing CoA. In addition, only 3messages (compared to 7) need to be exchanged between MN and CN and no one needs to go through the HA.

Finally, attacks lead by an attacker between the CN and the HA, and other newly identified attacks such as the one described in the following that are possible when using RR will no longer be possible:

Potential attacks to RR: Assume an ongoing IPv6 communication between two nodes A and B, which are not mobile, but B implements the CN function of MIPv6. A third node C is located on the path between A and B. In my impression, C could send a BU to node B for node A including an own "CoA". According to the return routability test, a correct binding in B can be established if C can intercept all packets sent to A's address. Thus, using MIPv6 RO, all packets sent from B to A will be delivered to the "CoA" at node C. If node C removes the MH and then forwards the packets, node A may not even notice this slight modification of routing.

Security properties of the Feige-Fiat-Shamir identification protocol include the following.

(a) Probability of forgery: the Feige-Fiat-Shamir identification protocol is provably secure against chosen message attacks in the following sense: provided that factoring n is difficult, the best attack has a probability $2^{-kt}$ of successful impersonation.
(b) Security assumption required: The security relies on the difficulty of extracting square roots modulo large composite integers n of unknown factorisation.
(c) Parameter selection: Choosing k and t such that kt=20 allows 1 in a million chance of impersonation.
(d) Flexibility: Computation, memory and communication can be traded off using the security parameters k and t: computation and communication may e.g. be reduced by trading off security parameters to yield a single iteration (t=1) when bandwidth is important; or on the contrary holding the product kt constant and increasing t while decreasing k, is optimised for low processing end points.

The communication complexity can be reduced if the MN sends to the CN (e.g. a 128 bits of) a hash value h(x) instead of x in message (1) with the CN's verification modified accordingly.

To summarize, this method and system according to the invention provides a secure and efficient solution to the IPv6 address ownership problem with the following properties:

The solution relies on Public/Private keys technologies and therefore allows the hosts to prove that they own the claimed IP address.

The solution is based on Public/Private keys but does not rely on digital signatures; the computational requirements are significantly reduced and the solution can therefore even be adopted by endpoints with low-power processors.

The protocol offers a lot of flexibility in terms of computation, memory and communication. These parameters can be traded off using the security parameters, making the solution suitable to different types of environments (e.g. for cellular links where bandwidth is limited and expensive).

Considerations about push services: The Home Address generated by the MN can have a long life time. Therefore, all the MNs that the MN contacted during this lifetime can initiate flows of IP packets towards the MN at any time.

Figure 2:
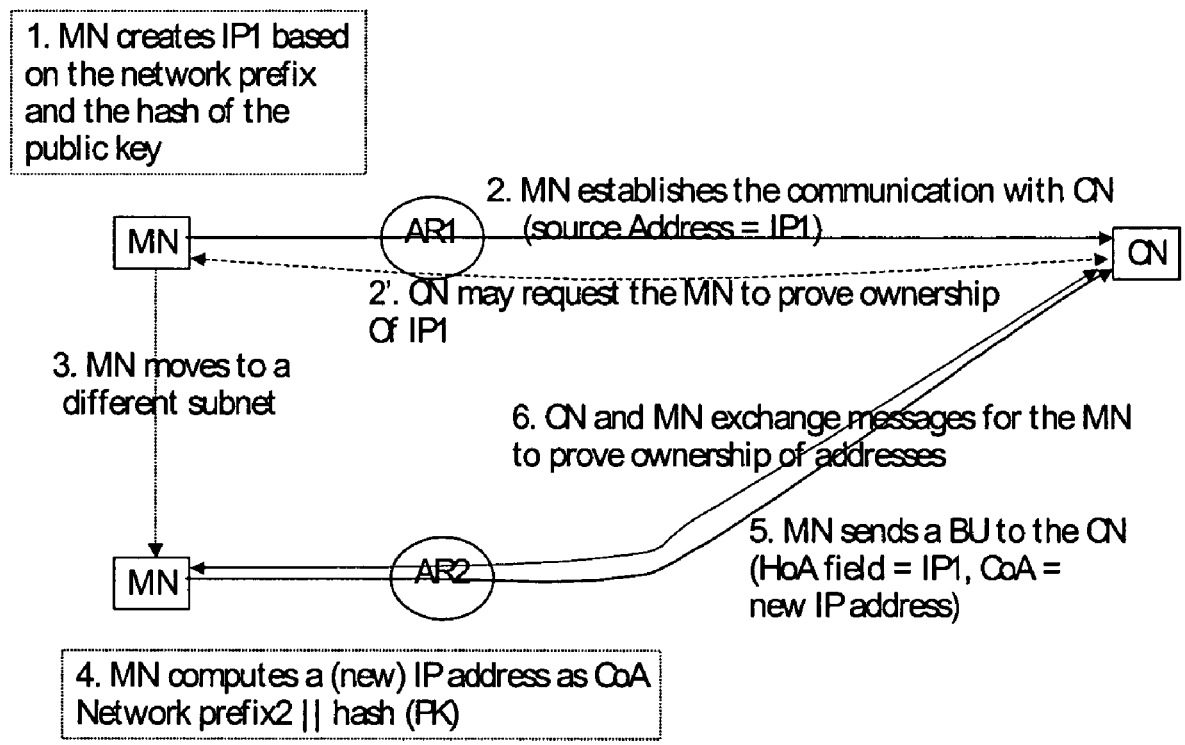
FIG. 2 illustrates a second embodiment of the invention.
Figure 3:
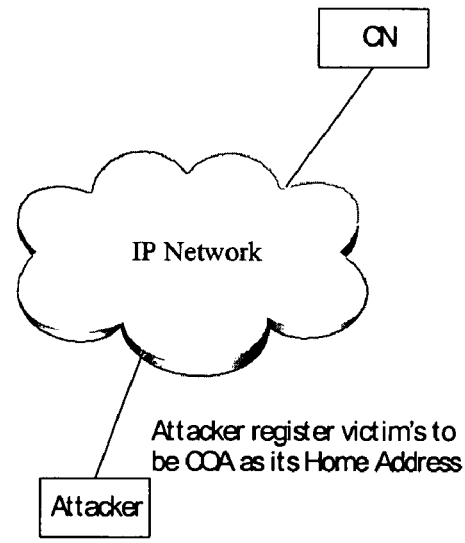
FIGS. 3 to 5 show a potential attack with regard to Ipv6 address ownership problem.
Figure 4:
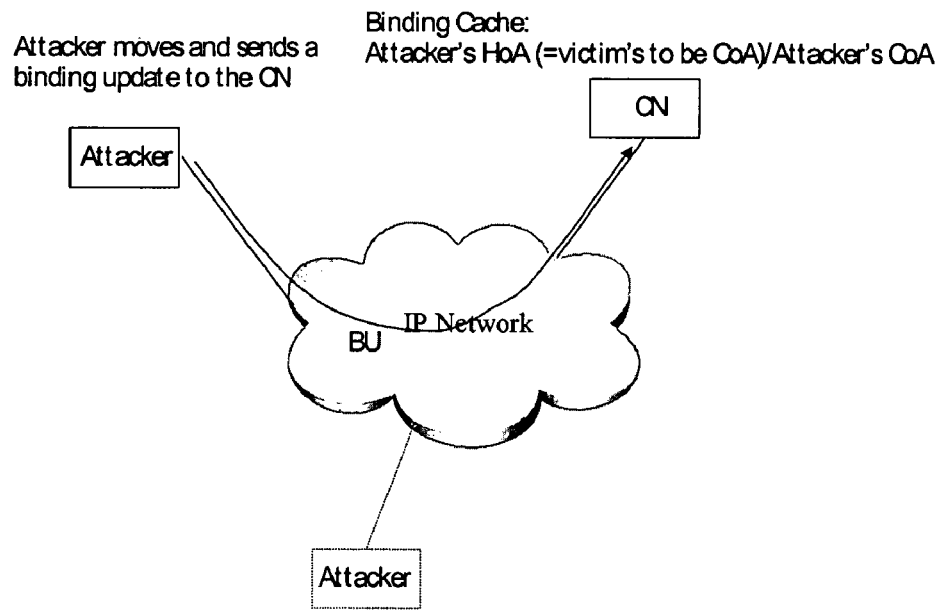
Figure 5:
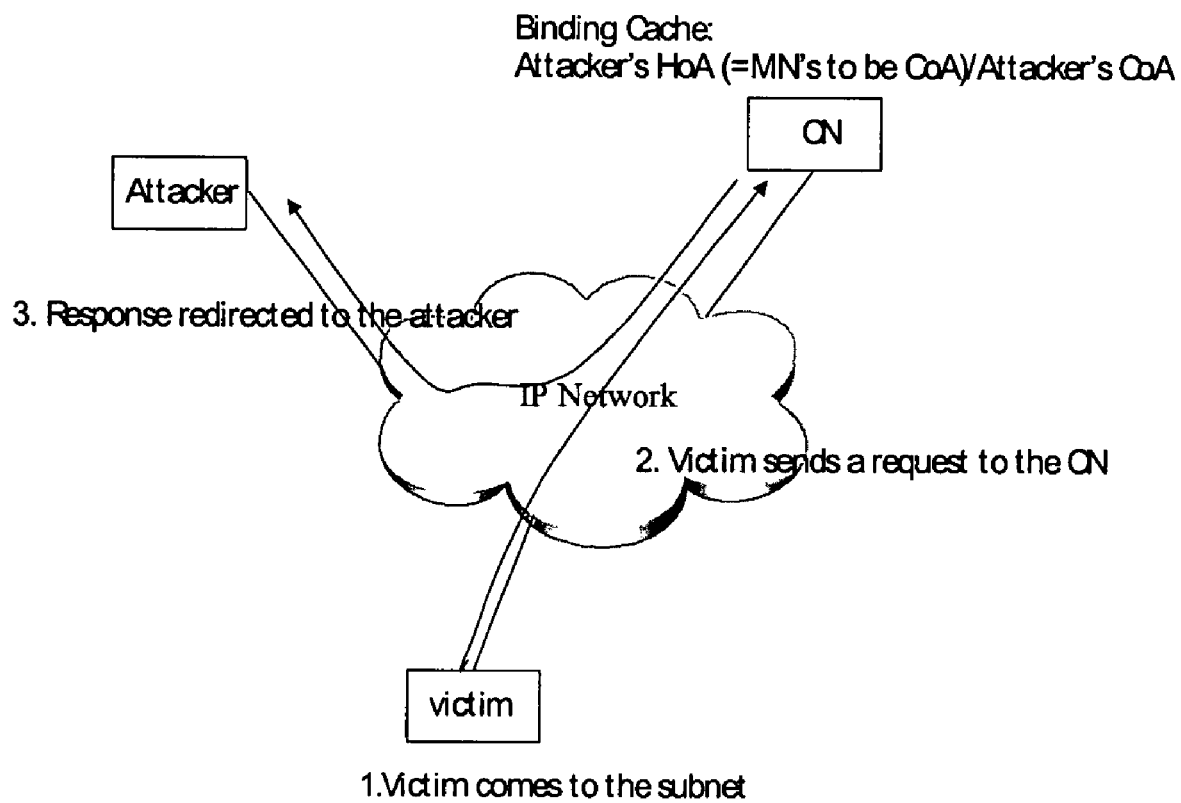

FIG. 2 describes an embodiment which implements locally generated dynamic Home Address. The embodiment of FIG. 2 will be described with reference to the step numbers attached to the arrows shown in FIG. 2.

In this scenario, the MN does not use any Home Agent and does not generate a HoA with a prefix corresponding to the home network. The MN computes (step 1) an IP address IP1 by concatenating the network prefix with the hash of the Public key: In terms of Mobile IPv6, IP1 should be considered as the Care-of Address, since it actually is the address at the point of connectivity.

In a step 2, the MN then establishes the communications with its CN using IP1 as if it were the MN Home Address (i.e. no Home Address option, no reverse tunnelling, source address is IP1).

After moving to some other subnet (step 3), the MN will generate a CoA concatenating the network prefix and the hash of the public key (step 4) and send a Binding Update message (step 5) to the CN to create a binding cache between the first IP address (IP1 which is used by the MN as an HoA) and the CoA before sending any packet to the CN using the CoA. The procedures and the messages content (step 6) used for the MN to prove the CN the ownership of the IP addresses are the same than in the previous usage scenario.

5a. MN->CN: $x(=+/-r^2 \mod n)$; HoA; CoA

The MN actually chooses a random integer r, $1<r<n-1$, and a random bit b; computes $x=(-1)^b \cdot r^2 \bmod n$ and sends x (the witness) to CN with its HoA and its CoA.

5b. MN<-CN: $(e_1, \ldots, e_k)$ with each $e_j$ equals 0 or 1; cookie

In response, the CN sends to MN (the challenge) a random k-bit vector $(e_1, \ldots, e_k)$ and a cookie: the generation of the cookie is implementation dependant. It could e.g. be computed taking as inputs the HoA, the CoA, the Challenge and some internal secret.

5c. MN->CN: $y(=r*\Pi(e_j=1)s_j \bmod n)$; $(v_1, v_2, \ldots v_k)$; n; HoA; CoA; cookie MN computes and sends to CN the response $y=r*\Pi$(j from 1 to k)$s_j^{(ej)} \bmod n$ (the product of r and those $s_j$ specified by the challenge)

The CN verifies that hash $(v_1, v_2, \ldots v_k; n)$=IP addresses suffix, and the cookie is valid before computing $z=y^2*\Pi$(j from 1 to k)$v_j^{(ej)} \bmod n$ and verifying that $z=+/-x$ and $z\neq 0$.

If the verifications pass, the CN creates a binding cache for the MN and sends the MN a Binding acknowledgement to inform it of the success.

Generally, digital signatures are more vulnerable to impersonation since an adversary can more easily discover an entity's long term private keying material using chosen-text attacks because in digital signatures, the claimant uses its private key to compute its response and thus a response may reveal partial information; whereas in zero-knowledge identification protocol such as Fiat-Shamir, the response $y=r$ is independent of the MN's secret $s_1, s_2, \ldots s_k$; while the response $y(=r*\Pi(ej=1)s_j \bmod n$ also provides no information about $s_1, s_2, \ldots s_k$ because the random r is unknown to the CN. In conclusion, the invention is also an improvement with respect to CGA.

According to a further embodiment of the invention, the following steps and/or means are provided.

In a Set-up phase: The user generates one pair of private/public keys according to the adopted zero-knowledge identification protocol (e.g. Feige Shamir identification protocol, Giullou Quisquater identification protocol, Schnorr identification protocol, or any derived or new identification protocol). The user then computes a hash of the public key and the result is used at or as the suffix for the IPv6 address. Instead of using the Layer 2 address as specified in the stateless address autoconfiguration, the user will use the hash of the public key to derive the IPv6 address.

Protocol messages: When A needs to prove its address ownership to B (e.g. in MIP for Binding Update), A and B send the following messages or information:

A--->B: Witness
A<---B: Challenge
A--->B: Response, Public Key, modulus

The way these parameters are computed depends on the adopted identification protocol. One example has been described above for illustration of the invention. Another example embodiment of the invention incorporating the above features will be described below. One of the main ideas relies in sending one, or more preferably a set of, questions from B to A using an identification protocol, preferably a zero-knowledge identification protocol (in above step 2, A<---B). A being able to answer correctly to all the questions (above step 3; B--->A), will prove that A has knowledge of the private key corresponding to the public key whose hash is in the IP address. B then compares the claimed public key with the hash value from the IP address and e.g. makes some other verifications as described below. In this manner B will be able to verify that A owns the claimed IP address.

The embodiments of the invention are not restricted to selection of a specific identification protocol and thus allows more flexibility as mentioned above.

In accordance with the disclosed embodiments, the invention presents a method for an entity to prove that it owns an IP address; and as a derived benefit, presents an efficient way to authenticate the binding updates in Mobile IP thus allowing a large scale deployment of this important protocol.

Advantages of the invention include the following. Compared to CGA, this solution also uses Public keys but does not rely on digital signatures to prove the ownership of the address. This solution is therefore well suited for endpoints with low-power processors. Most mobile nodes fall in that category.

Digital signatures requires a lot of processing. As a rough performance comparison, the Fiat Shamir protocol requires between one and two orders of magnitude fewer full modular multiplications (steps) by the prover than an RSA private key operation. When kt=20 and n=512 bits (see below embodiment), Fiat Shamir uses from 11 to about 30 steps whereas a full exponentiation in unoptimized RSA takes 768 steps.

The digital signature verification at the receiving end also requires a lot of processing.

Compared to the current RR test defined in the MIPv6 (Mobile IP version 6) specifications, thanks to the proposed scheme, MN will only have to send authenticated BU when changing CoA. In addition, only three messages (compared to seven) need to be exchanged between MN and CN and none of these messages needs to go through the HA.

Finally attacks lead by an attacker between the CN and the HA that are possible when using RR will no longer be effective.

Compared to a derivation of the IPv6 address using the advertised network prefix and one time passwords as the suffix, the solution described in this document does not have any limitation whereas one time passwords may all be used out after some time and then the derived IP address can not be used anymore but must be renewed. The solution proposed according to this embodiment of the invention has an unlimited lifetime (actually until the public/private is broken) whereas the solution relying on one time passwords can only be used a limited number of times.

Security properties of the Feige-Fiat-Shamir identification protocol used in the below described embodiment are as follows.

(a) Probability of forgery: the Feige-Fiat-Shamir identification protocol is provably secure against chosen message attack in the following sense: provided that factoring n is difficult, the best attack has a probability $2^{-kt}$ of successful impersonation (b) Security assumption required: The security relies on the difficulty of extracting square roots modulo large composite integers n of unknown factorisation (c) Parameter selection: Choosing k and t such that kt=20 allows 1 in a million chance of impersonation (d) Flexibility: Computation, memory and communication can be traded off using the security parameters k and t: computation and communication may e.g. be reduced by trading off security parameters to yield a single iteration (t=1) when bandwidth is important; or on the contrary holding the product kt constant and increasing t while decreasing k, is optimised for low processing end points.

The embodiment of the invention described below is based on the Feige-Fiat-Shamir identification protocol.

A summary of this embodiment is: A proves its address ownership in t executions of a 3-pass protocol.

Parameters Set up: A computes the common modulus n=pq after selecting two secret primes p and q each congruent to a modulus, e.g. to 3 mod 4, and such that n is computationally infeasible to factor. Integers k and t are defined as security parameters;

Computation of the secrets: Each entity A does the following:
(a) select k random integers $s_1, s_2, \ldots s_k$ in the range $1 < s_i < n-1$ and k random bits $b_1, \ldots, b_k$
(b) compute $vi = (-1)^{bi} \cdot (s_i^2)^{-1}$ mod n for $1 < i < k$
(c) A computes a hash of its public key $(v_1, v_2, \ldots v_k; n)$ and derives the corresponding IP address. A securely stores its private key $(s_1, \ldots, s_k)$. This completes the set-up phase.

Protocol messages
A->B: $x(=+/-r^2 \mod n)$
B<-A: $(e_1, \ldots, e_k)$ with each $e_i$ equals 0 or 1
A->B: $y(=r^*\Pi(e_j=1)s_j \mod n); (v_1, v_2, \ldots v_k)$; n (and optionally in the context of MIPv6, the binding update to update the binding cache with the new CoA—in such case, the packet preferably is also integrity protected with a BSA).
Protocol actions:
(a) A chooses a random integer r, $1 < r < n-1$, and a random bit b; computes $x = (-1)^b \cdot r^2 \mod n$ and sends x (the witness) to B;
(b) B sends to A (the challenge) a random k-bit vector $(e_1, \ldots, e_k)$
(c) A computes and sends to B the response $y = r^*\Pi(j$ from 1 to $k)s_j^{(ej)}$ mod n(the product of r and those $s_j$ specified by the challenge);
(d) B verifies that hash $(v_1, v_2, \ldots v_k; n)$=IP address's suffix before computing $z = y^{2*}\Pi(j$ from 1 to $k)v_j^{(ej)}$ mod n and verifying that $z = +/-x$ and $z \neq 0$.

In another embodiment of the invention described below, in order to prove that the user owns the IP address, the invention describes, in accordance with another implementation, a new way to generate the IP address. This solution is based on using one time password for solving the IPv6 address ownership problem.

This embodiment includes a set-up phase wherein a user A (or MN) begins with a secret K. Let h( ) be a one way hash function (e.g. OWF). K could actually be the result of a hash function h( ), or the result of a concatenation of different information (e.g. a secret, the destination IP address, etc.).

A constant t is fixed (e.g. t=100 or 1000), defining the number of identifications to be allowed. (The system is thereafter restarted with a new K to avoid replay attacks)

A computes the suffix (one time password) using K, e.g. using the equation $K_0 = h^t(K)$, and generates the IP address $IP_A$ as the concatenation of the prefix (advertised in the router advertisement messages) and $K_0$ (one time password):

$IP_A = \text{Prefix} \| K_0$.

Protocol Messages:

When A needs to prove its address ownership to B (e.g. in MIP for Binding Update), for the $i^{th}$ time, $1 < i < t$, A sends the following (e.g. in addition to the binding update in MPv6):

$A \longrightarrow B: A, i, K_i(=h^{t-i}(K))$ \hfill (1)

Protocol Actions:

To prove the address ownership for the $i^{th}$ time (e.g. when sending a binding update), A computes $K_i = h^{t-i}(K)$ (easily done either from K itself or from an appropriate intermediate value saved during the computation of $h^t(K)$ initially), and transmits (1) to B.

B checks that $i = i_A$ ($i_A$ is initially set to 1) and that the received $K_i$ satisfies the hash function $h(K_i) = K_{i-1}$. If both checks succeed, B knows A owns the address, sets $i_A = i_A + 1$ and saves $K_i$ for the next verification.

Compared to CGA, this solution does not rely on digital signatures, which require heavy computations both at the sender and receiving end. This solution only relies on some hash operations and is therefore well suited for endpoints with low-power processors. Most mobile nodes fall in that category.

Compared to the current RR test defined in the MIPv6 specifications, MN will only have to send authenticated BU when changing CoA. In addition, only 2 messages (compared to 7) need to be exchanged between MN and CN and none of these messages needs to go through the HA.

Finally attacks leaded by an attacker between the CN and the HA possible when using RR will no longer be effective.

The solutions proposed are very efficient compared to all other existing solutions, both from the point of view of communication and computation, while providing a good level of security. The solutions are well suited for short term connections due to the limited number of times the IPv6 node can prove its ownership of the address without having to change the address.

This embodiment considers the specific scenario where the MN relies on a Home agent to support the mobility related procedures and takes the Feige Fiat Shamir as the identification protocol to illustrate the solution; but the proposed methods and systems are also valid in other scenarios (e.g. MN support mobility without any HA but only by sending BU to its CNs) and with other identification protocols.

The methods and systems described in this document can be used with any identification protocol and depending on the application and the performance requirements, FFS, Guillou Quisquater, Schnorr or some other identification protocol may be better suited: each one having its own advantages and disadvantages: e.g. Schnorr identification has the advantage of requiring only a single on-line modular multiplication by the claimant, provided exponentiation may be done as a pre-computation whereas GQ allows the simultaneous reduction of both memory (parameter k) and transmission bandwith (parameter k).

At least some of the above described embodiments relate to Mobile IP. Note that the invention is not restricted to Mobile IP, and can also be applied to more generic cases as well such as simple (i.e. non-mobile) IP case, or other protocol types different from IP, or other scenarios (e.g. TCP), or other types of nodes such as stationary nodes instead of mobile nodes.

Although preferred embodiments have been described above, the invention is not limited thereto and may also be implemented in other ways, e.g. by combining, in any arbitrary fashion, one or more features of one or more embodiments with one or more features of other embodiments.

What is claimed is:

1. A method of confirming ownership of an address by a first device to a second device, the method comprising:
(a) identifying a number of identifications allowed;
(b) identifying a secret value at a first device, wherein the number of identifications allowed is based on a maximum number of times the secret value may be used before the secret value is changed;
(c) calculating a first address value based on the identified secret value and the identified number of identifications allowed;
(d) generating an address as a concatenation of a second address value and the calculated first address value;

(e) sending the generated address from the first device to a second device;
(f) receiving a request to confirm ownership of the generated address from the second device at the first device;
(g) identifying a number of confirmations previously performed between the first device and the second device;
(h) calculating a first value based on the identified secret value and the identified number of confirmations performed;
(i) sending a first message from the first device to the second device, the first message including the calculated first value so that the second device can confirm ownership of the generated address by the first device;
(j) comparing the identified number of confirmations performed with the identified number of identifications allowed; and
(k) based on an outcome of the comparison, identifying a second secret value at the first device and repeating (c)-(i) replacing the identified secret value with the identified second secret value.

2. The method of claim 1, further comprising receiving a router advertisement message including an address prefix, wherein the second address value comprises the address prefix.

3. The method of claim 1, further comprising repeating (f), (g), (h), (i), (j), and (k).

4. The method of claim 3, wherein the first message further includes the identified number of confirmations performed.

5. The method of claim 1, wherein the first message comprises a binding update message sent using a mobile Internet protocol version 6 protocol.

6. A communication device, the communication device comprising:
a processor;
a communication interface operably coupled to the processor; and
a computer-readable medium including computer-readable instructions stored therein that, upon execution by the processor, perform operations comprising
(a) identifying a number of identifications allowed;
(b) identifying a secret value, wherein the number of identifications allowed is based on a maximum number of times the secret value may be used before the secret value is changed;
(c) calculating a first address value based on the identified secret value and the identified number of identifications allowed;
(d) generating an address as a concatenation of a second address value and the calculated first address value;
(e) sending the generated address to a second device via the communication interface;
(f) receiving a request to confirm ownership of the generated address from the second device via the communication interface;
(g) identifying a number of confirmations previously performed between the communication device and the second device;
(h) calculating a first value based on the identified secret value and the identified number of confirmations performed; and
(i) sending a first message to the second device via the communication interface, the first message including the calculated first value so that the second device can confirm ownership of the generated address;
(j) comparing the identified number of confirmations performed with the identified number of identifications allowed; and
(k) based on an outcome of the comparison, identifying a second secret value and repeating (c)-(i) replacing the identified secret value with the identified second secret value.

7. The communication device of claim 6, wherein the operations further comprise receiving a router advertisement message including an address prefix, wherein the second address value comprises the address prefix.

8. The communication device of claim 6, wherein the operations further comprise repeating (f), (g), (h), (i), (j), and (k).

9. The communication device of claim 8, wherein the first message further includes the identified number of confirmations performed.

10. The communication device of claim 6, wherein the first message comprises a binding update message sent using a mobile Internet protocol version 6 protocol.

11. A computer-readable medium including computer-readable instructions that, upon execution by a processor, cause the processor to calculate information that confirms ownership of an address by a first device to a second device, the instructions configured to cause a computing device to:
(a) identify a number of identifications allowed;
(b) identify a secret value, wherein the number of identifications allowed is based on a maximum number of times the secret value may be used before the secret value is changed;
(c) calculate a first address value based on the identified secret value and the identified number of identifications allowed;
(d) generate an address as a concatenation of a second address value and the calculated first address value;
(e) send the generated address to a second device;
(f) receive a request to confirm ownership of the generated address from the second device;
(g) identify a number of confirmations previously performed between a first device and the second device;
(h) calculate a first value based on the identified secret value and the identified number of confirmations performed; and
(i) send a first message to the second device, the first message including the calculated first value so that the second device can confirm ownership of the generated address;
(j) compare the identified number of confirmations performed with the identified number of identifications allowed; and
(k) based on an outcome of the comparison, identify a second secret value and repeat (c)-(i) replacing the identified secret value with the identified second secret value.

12. The computer-readable medium of claim 11, wherein the instructions are further configured to cause the computing device to receive a router advertisement message including an address prefix, wherein the second address value comprises the address prefix.

13. The computer-readable medium of claim 11, wherein the instructions are further configured to cause the computing device to repeat (f), (g), (h), (i), (j), and (k).

14. The computer-readable medium of claim 13, wherein the first message further includes the identified number of confirmations performed.

15. The computer-readable medium of claim 11, wherein the first message comprises a binding update message sent using a mobile Internet protocol version 6 protocol.

* * * * *

UNITED STATES PATENT AND TRADEMARK OFFICE
CERTIFICATE OF CORRECTION

| | |
|---|---|
| PATENT NO. | : 7,546,456 B2 |
| APPLICATION NO. | : 10/615829 |
| DATED | : June 9, 2009 |
| INVENTOR(S) | : Le et al. |

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 580 days Delete the phrase "by 580 days" and insert -- by 893 days --

Signed and Sealed this

Fourth Day of May, 2010

David J. Kappos
*Director of the United States Patent and Trademark Office*